(12) United States Patent
Kitoh

(10) Patent No.: US 6,228,529 B1
(45) Date of Patent: May 8, 2001

(54) LITHIUM SECONDARY BATTERY

(75) Inventor: Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/350,519

(22) Filed: Jul. 9, 1999

(30) Foreign Application Priority Data

Jul. 14, 1998 (JP) .................................................. 10-199092
Jun. 17, 1999 (JP) .................................................. 11-171238

(51) Int. Cl.$^7$ .................................................. H01M 2/02
(52) U.S. Cl. .............................................. 429/164; 429/94
(58) Field of Search ........................................ 429/164, 94

(56) References Cited

FOREIGN PATENT DOCUMENTS

| 0 573 266 | 12/1993 | (EP) . |
| 0 689 260 | 12/1995 | (EP) . |
| 0 771 040 | 5/1997 | (EP) . |
| 0 776 056 | 5/1997 | (EP) . |
| 0 887 873 | 12/1998 | (EP) . |
| 2-056871 | 5/1990 | (JP) . |
| 2701347 | 10/1997 | (JP) . |

*Primary Examiner*—Laura Weiner
(74) *Attorney, Agent, or Firm*—Burr & Brown

(57) ABSTRACT

A lithium secondary battery, including a positive electrode, a negative electrode, a separator, an internal electrode body, and an organic electrolyte, the positive electrode and the negative electrode being wound through the separator so that the positive electrode and the negative electrode are not brought into direct contact with each other, wherein when the number of turns of the positive electrode or the negative electrode per unit length (turns/cm) along the direction of diameter of the internal electrode body is multiplied by total thickness (cm) of the electrode active material layers, being designated as a correction winding density (turns), the correction winding density is not less than 0.73 (turns).

7 Claims, 3 Drawing Sheets

ONE SIDE THICKNESS OF POSITIVE ACTIVE MATERIAL LAYER :
WITH 100 μ m

ONE SIDE THICKNESS OF POSITIVE ACTIVE MATERIAL LAYER :
WITH 150 μ m

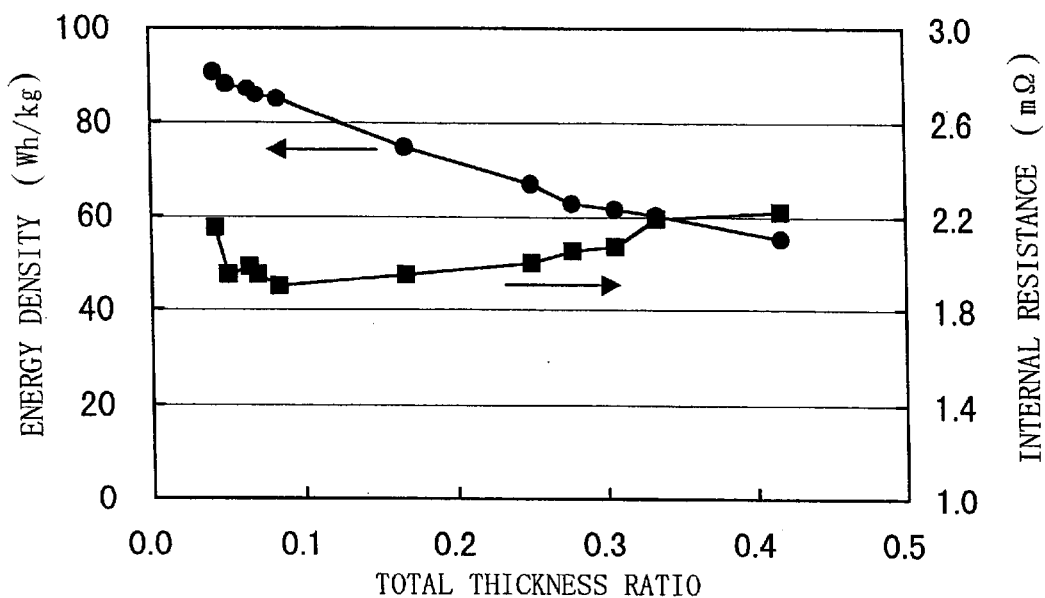
FIG. 3 (a) ONE SIDE THICKNESS OF POSITIVE ACTIVE MATERIAL LAYER : WITH 100 μm
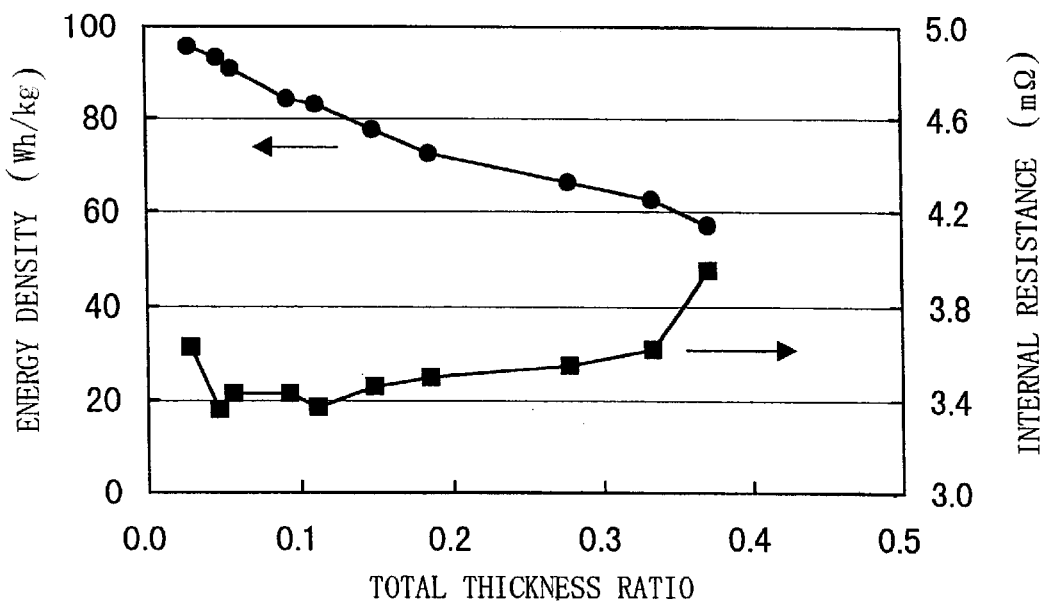
FIG. 3 (b) ONE SIDE THICKNESS OF POSITIVE ACTIVE MATERIAL LAYER : WITH 150 μm

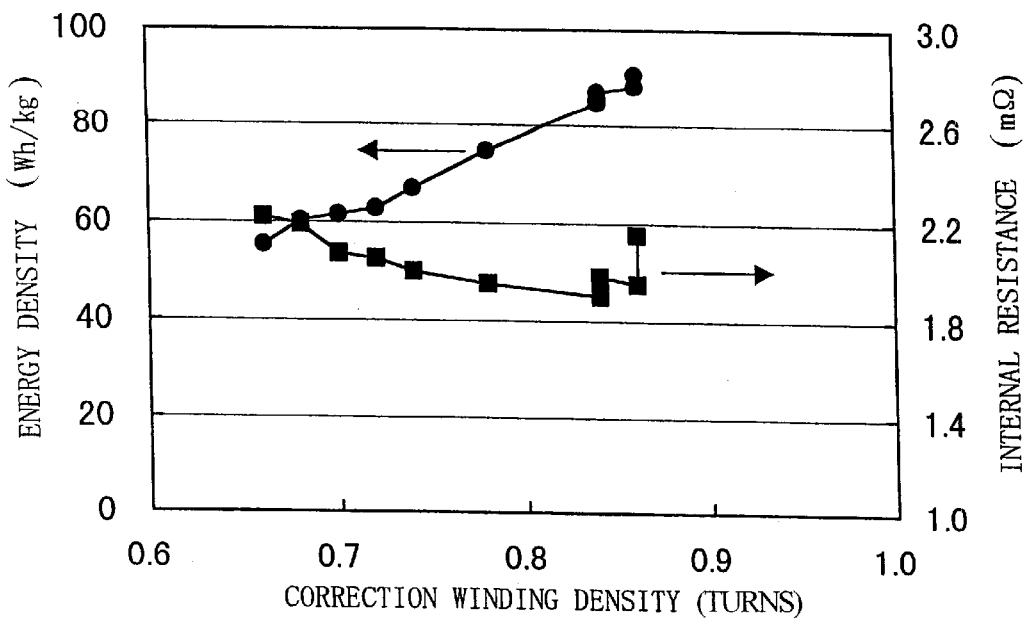
FIG. 4 (a) ONE SIDE THICKNESS OF POSITIVE ACTIVE MATERIAL LAYER : WITH 100 μm
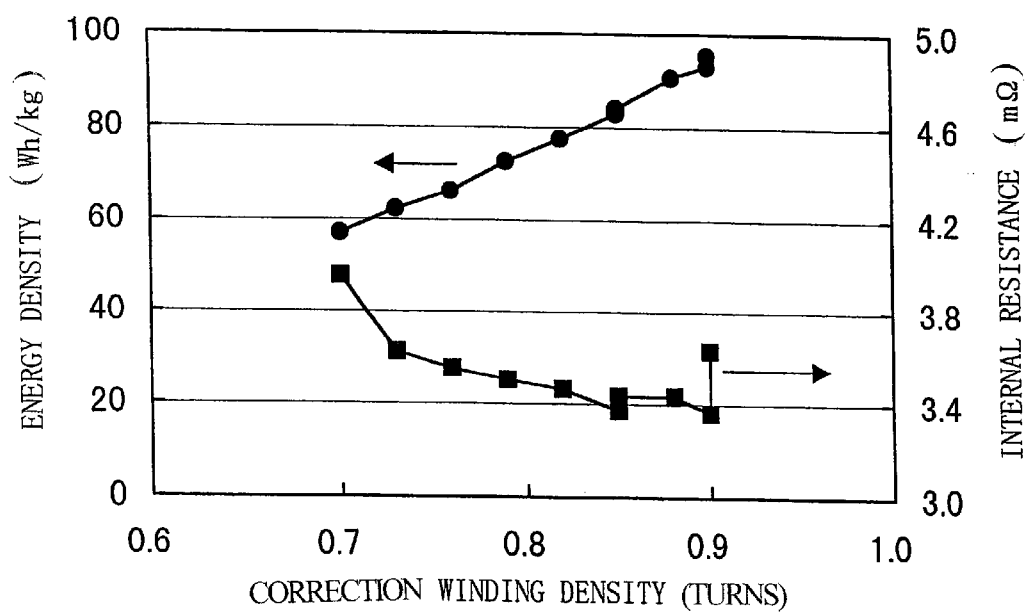
FIG. 4 (b) ONE SIDE THICKNESS OF POSITIVE ACTIVE MATERIAL LAYER : WITH 150 μm

LITHIUM SECONDARY BATTERY

BACKGROUND OF THE INVENTION AND RELATED ART STATEMENT

This invention relates to a lithium secondary battery able to be used to drive the motor of an electric vehicle, and more particularly to a lithium secondary battery which can reduce internal resistance and attain good charging-discharging characteristics, as well as an high output and a huge current, by setting the shape parameters of an internal electrode body under predetermined conditions.

In recent years, with the heightening of the movement to protect the environment, and the eagerness to regulate emission of exhaust gasses, including carbon dioxide as well as other harmful matters, in the automobile industry, the replacement of automobiles using fossil fuels, such as a vehicle driven by gasoline, the movement to promote an introduction of an electric vehicle (EV), and a hybrid electric vehicle (HEV) has become active.

As a battery able to drive motors of such EV as well as HEV, a lithium secondary battery with a large energy density is expected to be promising battery. However a lithium secondary battery is required to attain characteristics such as large capacity, as well as high output so as to attain predetermined acceleration performance, slope-climbing performance, and continuous running performance. For example, when an HEV is in a mode to require output power at the time of acceleration, therefore, a high output is required for a battery to drive a motor. Here, the voltage per battery depends on materials configuring the battery. In the case of a lithium secondary battery, the voltage is approximately 4.2 V at highest. Moreover, a huge output means a huge current to flow.

On the other hand, when a plurality of batteries are connected in series for use in securing the required voltage for driving a motor, the same quantity of current will flow through each battery. Actually, in an HEV, it can frequently occur that a current not less than 100 A flows. Accordingly, it is important to reduce the internal resistance of a battery as much as possible so that such high output characteristics, as well as huge current characteristics, are realized.

Here, the internal resistance of a battery is determined by the resistance value of configuring members of the battery. It is extremely important that the resistance of an internal electrode body (charge-discharge unit) to be regarded as a central part of a battery should be reduced.

However, lithium secondary batteries currently in practical use for electric appliances, do not have large battery capacities and there are few cases that large currents have been required in their use, therefore no detailed studies on the resistance of the internal electrode body in the battery have been conducted to date.

For example, Japanese Patent No. 2701347 specification discloses a lithium secondary battery comprising a band-shaped positive electrode, and a band-shaped negative electrode, both electrodes being wound around each other in order to configure a wound body, wherein the positive active material layer configuring the band-shaped positive electrode and the negative active material layer configuring the band-shaped negative electrode have a predetermined thickness respectively, and the ratio of respective thickness falls within a predetermined range.

The lithium secondary battery disclosed in Japanese Patent No. 2701347 specification is one in which the elements configuring the internal electrode body, are regulated nevertheless the resistance of the internal electrode body has not been studied. That is, in spite of the fact that the thickness of the electrode active material layer is a factor affecting resistance of the internal electrode body, this point has not been discussed. In addition, no consideration has been given to the influence of the resistance of electrode substrate (current collector (metal foil)) itself, which is indispensable in configuring a band-shaped electrode as well as of the band-shaped electrode itself to the resistance of the internal electrode body.

In addition, the lithium secondary battery disclosed in Japanese Patent No. 2701347 specification has been made mainly to be used as a power source for an electronic appliance, aiming at fulfilling the requirement for larger capacity, that is, mainly aiming at improvement in energy density. In addition, it aims to prevent the occurrence of cracks in an electrode, and therefore, in Japanese Patent No. 2701347 specification no descriptions indicating that higher output has been the purpose thereof are found.

Thus, since development of a compact battery has been aimed mainly at achieving higher energy density, it is of concern how to provide a lithium secondary battery the output of which serious consideration has been given. Also, the relationship between thickness of electrode substrate of each positive and negative electrode and thickness of electrode active material layer would affect the resistance of an internal electric body was not well understood. In addition, the density of winding, that is, the number of turns of the positive electrode or the negative electrode per unit length along the direction of diameter of the internal electrode body, was similarly not well understood.

Moreover, Japanese Patent No. 2701347 specification describes that it is preferable that lithium cobalt oxide ($LiCoO_2$), with a large lithium capacity, as the positive active material be used since the disclose lithium secondary battery is formed with the main purpose being improvement of energy density, as described above.

However, in the case where the main purpose is reduction in the resistance of an internal electrode body, as well as higher output, the quantity of lithium in a positive active material may be lessened to fall within a range which can secure the predetermined quantity. In this case, the use of positive active material in making resistance of the positive active material layer smaller is regarded as more important.

Incidentally, also as for a lithium secondary battery with a large capacity mainly aiming at the above-described higher output such as to be used in EV, etc., it goes without saying that weight should be preferably lighter if the battery capacity is the same. In addition, if the volume of a battery is smaller, less mounting space is required in a vehicle, preferably resulting in larger freedom in space designing. Moreover, it is costly disadvantageous as well to use many materials without necessity.

SUMMARY OF THE INVENTION

The present invention was attained, contemplating the problems of the prior art mentioned above. According to the present invention, there is provided a lithium secondary battery, comprising a positive electrode, a negative electrode, a separator, and an internal electrode body, an organic electrolyte, the positive electrode and the negative electrode being wound through the separator so that the positive electrode and the negative electrode are not brought into direct contact with each other, wherein a total thickness ($\mu$m) of electrode substrates is divided by a total thickness ($\mu$m) of electrode active material layers, the resultant ratio being a total thickness ratio, which total thickness ratio is not less than 0.045 and not more than 0.31. Here, it is more preferable that the value of this ratio is not less than 0.05 and not more than 0.25.

In addition, according to the present invention, there is provided a lithium secondary battery, comprising a positive electrode, a negative electrode, a separator, and an internal electrode body, an organic electrolyte, the positive electrode and the negative electrode being wound through the separator so that the positive electrode and the negative electrode are not brought into direct contact with each other, wherein when the number of winding (turns/cm) of the positive electrode or the negative electrode per unit length along the direction of diameter of the internal electrode body is multiplied by total thickness (cm) of the electrode active material layers, being designated as a correction winding density (turns), the correction winding density is not less than 0.73 (turns).

In the above-described lithium secondary battery of the present invention, $LiMn_2O_4$ spinel is preferably used as a positive electrode active material to be used for the positive electrode, $LiMn_2O_4$ spinel having Li/Mn ratio of more than 0.5 is used more preferably. On the other hand, as a negative active material to be used in the negative electrode, highly graphitized carbon material is suitably used and the one in form of fiber quality is used more preferably. The lithium secondary battery according to the present invention is designed to reduce the battery's internal resistance and to attain higher output, and thus can be suitably used in an electric vehicle (EV) or a hybrid electric vehicle (HEV). In addition, the battery is suitably applied to a battery having battery capacity of not less than 5 Ah which gives remarkable effects with higher output.

BRIEF DESCRIPTION OF THE DRAWINGS

FIGS. 3(a)(b) are graphs showing the relationship between the total thickness ration and the battery's internal resistance as well as energy density; and FIGS. 4(a)(b) are graphs showing the relationship between the correction winding density and the battery's internal resistance as well as energy density.

DETAILED DESCRIPTION OF PREFERRED EMBODIMENT

Figure 1:
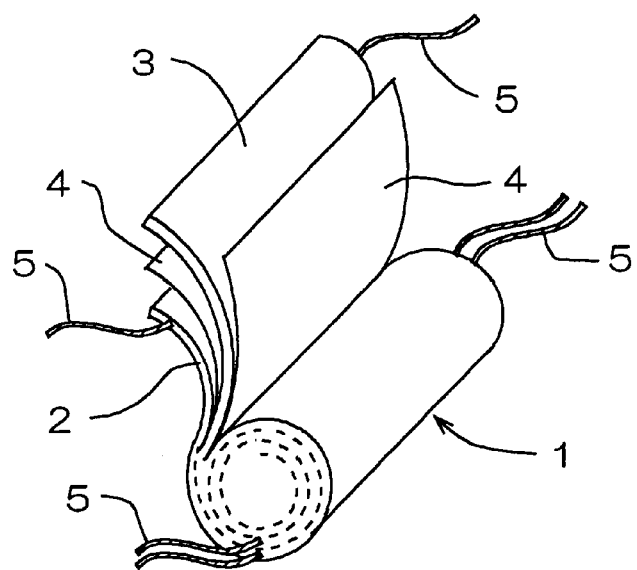
FIG. 1 is a perspective view showing the structure of a wound-type internal electrode body.

An internal electrode body of a lithium secondary battery in the present invention (hereinafter to be referred to as a battery) is configured by comprising a positive electrode, a negative electrode, and a separator made of porous polymer film, the positive electrode and the negative electrode being wound through the separator so that the positive electrode and the negative electrode are not brought into direct contact with each other. In particular, as shown in FIG. 1, the internal electrode body 1 is formed by winding a positive electrode 2 and a negative electrode 3 through a separator 4, and the respective positive and negative electrode plates 2 and 3 (hereafter referred to as electrodes 2 and 3) are provided with tabs 5. These tabs 5 can be attached to the electrodes 2 and 3 by ultrasonic welding or the like when the electrodes 2 and 3 are wound with the separator 4. Incidentally, the opposite end of each tab 5 which end has been connected to the electrodes 2 and 3 is attached to an output terminal (not shown) or a current extraction terminal (not shown) being conductive to the output terminal.

For the electrodes 2 and 3, the positive electrode 2 comprises metal foils and the electrode active materials, the metal foil made of aluminum, and titanium, the positive electrode 2 and the metal foil being made of copper and nickel. The negative electrode 3 being assigned as electrode substrates (electricity collection bodies), with electrode active materials being coated on the both sides of respective metal foils to form electrode active material layers to produce the electrodes 2 and 3. In addition, the tabs 5 are disposed along one side of such metal foils, and generally thin band type ones are used so that portions in the electrodes 2 and 3 where tabs 5 have been attached may not swell toward outer circumference at the time when the internal electrode body 1 has been formed. At that time, the tabs 5 are preferably disposed at an approximately equal distance so that one tab 5 may collect electricity from a fixed area in the electrodes 2 and 3, and in many cases the same material as that of the metal foil where the tab 5 is attached is adopted as the material of the tab 5.

As the positive active material to be used to form the positive electrode 2, in the present invention, lithium manganese oxide ($LiMn_2O_4$) spinel is most suitably used. The $LiMn_2O_4$ spinel belongs to the space group Fd3m, and has as a characteristic that diffusion of Li ions takes place three-dimensionally, and therefore, is more suitable for the purpose of resistance reduction as well as higher output attainment and smaller diffusion resistance of Li ions in the battery reaction than in the case where such a material that causes diffusion of Li ions two-dimensionally, as in lithium cobalt oxide ($LiCoO_2$), which belongs to a space group R(-3)m ("-" indicates rotational inversion.) and has a layer-shape configuration. In addition, $LiMn_2O_4$ spinel has excellent electron conductivity and serves to provide remarkable effects in terms of resistance reduction on the positive electrode 2.

Moreover, a battery utilizing $LiMn_2O_4$ spinel has excellent characteristics in that resistance remains low even under conditions where discharge has been begun to an extent, that is, discharge depth is deep, and thus is especially excellent as a battery material for usage which requires higher output discharge.

As for $LiMn_2O_4$ spinel, one with composition of Li/Mn ratio exceeding 0.5 (Li/Mn ratio>0.5), that is, of more excessive Li than stoichiometry composition is to be used, preferably making it possible to plan reduction of resistance remarkably. As such $LiMn_2O_4$ spinel with composition of excess Li, $LiLi_xMn_{2-x}O_4$ spinel composition where a part of Mn has been replaced by Li (Li/Mn=(1×X)/(2-X)>0.5) and $LiM_xMn_{2-x}O_4$ (Li/Mn=1/(2-X)>0.5) where a part of Mn has been replaced by a metal element M as to be preferred.

As a replacement element M, the symbols of chemical elements can be listed as follows: Fe, Ni, Mg, B, Al, Co, Si, Ti, Sn, P, V, Sb, Nb, Ta, Mo, and W. In addition, the quantity of oxygen for the above-described $LiMn_2O_4$ spinel, is 4 in terms of stoichiometry composition, however, may be changed as far as its crystal configuration is maintained due to valence of proton ions as well as existence of lattice defect, etc.

As a positive active material, other than $LiMn_2O_4$ spinel, lithium transition metal compound oxides such as lithium cobalt oxide ($LiCoO_2$), lithium nickel oxide ($LiNiO_2$), are possibly used, but there is a problem that, as described before, their ion diffusions is two dimensional and has greater resistance. Incidentally, in all the cases where any of the above-mentioned positive active materials, for the purpose of further improving conductivity of the positive active materials as well as reducing resistance, it is also preferable to mix with an electrode active material the carbon powder such as acetylene black and graphite powder, etc.

On the other hand, for the negative electrode, an amorphous carbon material such as soft carbon or hard carbon, or carbon material such as artificial graphite and natural graphite, etc. can be used, and in the present invention it is preferable in particular to use highly graphitized carbon material and more preferably those having the form of fiber are suitably used.

The negative active materials are different each other in terms of Li capacity, and when a different negative active material is used for a same positive active material, changes are observed in the potential curve, thus it could occur that the desired battery characteristics are not obtainable. For example, in a lithium secondary battery disclosed in the above-described Japanese Patent Laid-Open No. 2701347 specification pitch coke (hard carbon) is suitably used, but in the case where pitch coke has been used, it is difficult to attain high output under deep discharge depth, thus pitch coke is not suitable for the purpose of the present invention.

As described before, in the case where $LiMn_2O_4$ spinel has been used as the positive active material, and especially in the case where highly graphitized carbon has been used as the negative active material, the internal resistance is maintained at a small enough level to enable high output discharge without difficulty, even in the state where the depth of discharge is deep thus the one extremely preferable battery characteristic can be obtained.

Each electrode active material of these kinds are in general respectively mixed with various solvents and binders to become a slurry, and thereafter is coated on the surface of the predetermined electrode substrate and fixed, thus the electrodes 2 and 3 are formed.

As the separator 4, it is preferable to use one having a three-layer configuration in which a polyethylene film having lithium ion permeability and including micropores has been sandwiched between porous polypropylene films having lithium ion permeability. This serves also as a safety mechanism when the temperature of internal electrode body 1 is raised, the polyethylene film is softened at about 130° C. so that the micropores are collapsed to suppress the movement of lithium ions, that is, the battery reaction. And with this polyethylene film, it becomes possible to prevent the direct contact between the electrodes 2, 3 even in the case where the polyethylene has been softened, and thereby it becomes possible to steadily suppress the battery reaction.

Incidentally, a nonaqueous organic electrolyte having one or more kinds of lithium fluoride complex compound such as $LiPF_6$, and $LiBF_4$, etc. or lithium halide such as $LiClO_4$ as an electrolyte are dissolved in a single solvent or mixed solvent of organic solvents such as a carbonic acid ester family such as ethylene carbonate (EC), diethyl carbonate (DEC), dimethyl carbonate (DMC) and propylene carbonate (PC), γ-butyrolactone, tetrahydrofuran, and acetonitrile, etc., is preferably used. Such an electrolyte fills the internal space of the battery case and consequently permeates into the internal electrode body 1.

Figure 2:
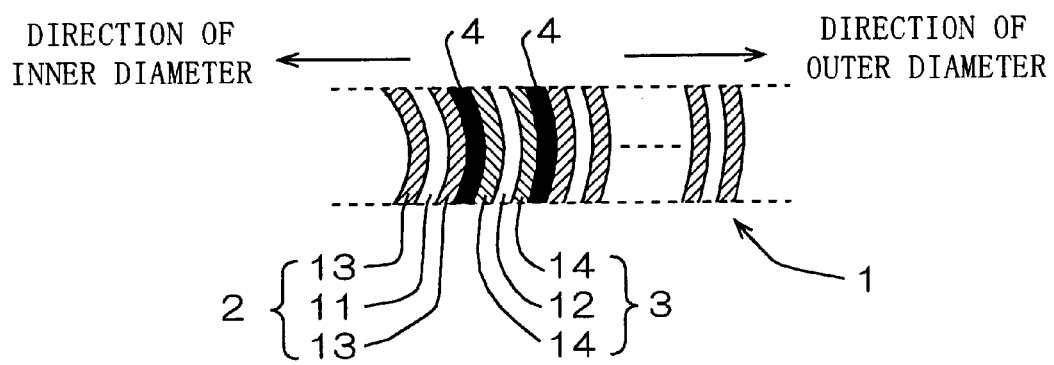
FIG. 2 is an enlarged view showing a part of section view perpendicular to the winding axis of the internal electrode body.

In the internal electrode body 1 to be formed by using the above-described materials, the relationship between thickness of an electrode substrate in the electrodes 2 and 3 and electrode active material layer to be coated on the electrode substrate of each electrode is thought to influence the battery's internal resistance to a large extent, to which point the present invention has paid attention. FIG. 2 is an enlarged view showing a part of section view perpendicular to the winding axis of the internal electrode body 1. In the present invention, the total thickness ratio is defined by dividing total thickness (μm) of electrode substrates with total thickness (μm) of electrode active material layers, the total thickness of electrode substrates being the sum of thickness of positive electrode substrate 11 and thickness of negative electrode substrate 12, and total thickness of electrode active material layers being the sum of total thickness of positive electrode active material layer 13 formed on both surfaces of the positive electrode 2 and total thickness of negative electrode active material layer 14 formed on both surfaces of the negative electrode 3, and then this total thickness ratio should be not less than 0.045 and not more than 0.31. Incidentally, it goes without saying that the unit of thickness of total thickness of electrode substrates and total thickness of electrode active material layers in not limited to "μm" if their units are the same.

Table 1 shows characteristics which were obtained when batteries were assembled to have internal electrode bodies with variously different kinds of this total thickness ration but to have a constant diameter. Incidentally, every kind of common material having been used to form the batteries has been described in Table 2. As can be seen in Table 1, to form the batteries, only thickness of electrode substrates and thickness of electrode active material layers were changed. But, the ration between thickness of the positive active material layers and thickness of the negative active material layers has been set as a constant. The purpose of this is to avoid making relationship between thickness of the electrode substrate and the internal resistance indistinct due to influence on battery capacity given by the ratio between thickness of the positive active material layer and the negative active material layer. In addition, the sizes of batteries is fixed at a constant. This serves necessarily to cause the number of turns to change if thickness of an electrode changes. Incidentally, the turning pressure at the time of electrodes being wound has been fixed at a constant in every battery to remove an influence to be given to the internal resistance.

TABLE 1

| Sample number | One side thickness of positive active material layer (μm) | Total thickness of electrode active material layers (μm) | Thickness of positive electrode substrate (μm) | Thickness of negative electrode substrate (μm) | Total thickness of electrode substrates (μm) | Total thickness ratio | Number of turns (turns) | Winding density (turns/cm) | Correction winding density (turns) | Energy density (Wh/kg) | Internal resistance (mΩ) |
|---|---|---|---|---|---|---|---|---|---|---|---|
| 1 | 100 | 360 | 10 | 5 | 15 | 0.042 | 44 | 23.8 | 0.86 | 90.7 | 2.15 |
| 2 | 100 | 360 | 10 | 8 | 18 | 0.050 | 44 | 23.8 | 0.86 | 88.2 | 1.95 |
| 3 | 100 | 360 | 15 | 8 | 23 | 0.064 | 43 | 23.2 | 0.84 | 87.1 | 1.98 |
| 4 | 100 | 360 | 15 | 10 | 25 | 0.069 | 43 | 23.2 | 0.84 | 85.8 | 1.95 |
| 5 | 100 | 360 | 20 | 10 | 30 | 0.083 | 43 | 23.2 | 0.84 | 84.9 | 1.90 |
| 6 | 100 | 360 | 40 | 20 | 60 | 0.167 | 40 | 21.6 | 0.78 | 74.7 | 1.95 |
| 7 | 100 | 360 | 60 | 30 | 90 | 0.250 | 38 | 20.5 | 0.74 | 67.0 | 2.00 |
| 8 | 100 | 360 | 60 | 40 | 100 | 0.278 | 37 | 20.0 | 0.72 | 62.8 | 2.05 |
| 9 | 100 | 360 | 70 | 40 | 110 | 0.306 | 36 | 19.5 | 0.70 | 61.5 | 2.07 |
| 10 | 100 | 360 | 80 | 40 | 120 | 0.333 | 35 | 18.9 | 0.68 | 60.2 | 2.19 |
| 11 | 100 | 360 | 100 | 50 | 150 | 0.417 | 34 | 18.4 | 0.66 | 55.3 | 2.22 |
| 12 | 150 | 540 | 10 | 5 | 15 | 0.028 | 31 | 16.8 | 0.90 | 95.5 | 3.63 |
| 13 | 150 | 540 | 15 | 10 | 25 | 0.046 | 31 | 16.6 | 0.90 | 93.2 | 3.36 |
| 14 | 150 | 540 | 20 | 10 | 30 | 0.056 | 30 | 16.2 | 0.88 | 90.7 | 3.43 |

TABLE 1-continued

| Sample number | One side thickness of positive active material layer (μm) | Total thickness of electrode active material layers (μm) | Thickness of positive electrode substrate (μm) | Thickness of negative electrode substrate (μm) | Total thickness of electrode substrates (μm) | Total thickness ratio | Number of turns (turns) | Winding density (turns/cm) | Correction winding density (turns) | Energy density (Wh/kg) | Internal resistance (mΩ) |
|---|---|---|---|---|---|---|---|---|---|---|---|
| 15 | 150 | 540 | 30 | 20 | 50 | 0.093 | 29 | 15.7 | 0.85 | 84.1 | 3.43 |
| 16 | 150 | 540 | 40 | 20 | 60 | 0.111 | 29 | 15.7 | 0.85 | 83.0 | 3.37 |
| 17 | 150 | 540 | 50 | 30 | 80 | 0.148 | 28 | 15.1 | 0.82 | 77.5 | 3.46 |
| 18 | 150 | 540 | 60 | 40 | 100 | 0.185 | 27 | 14.6 | 0.79 | 72.5 | 3.50 |
| 19 | 150 | 540 | 100 | 50 | 150 | 0.278 | 26 | 1.41 | 0.76 | 66.1 | 3.55 |
| 20 | 150 | 540 | 100 | 80 | 180 | 0.333 | 25 | 13.5 | 0.73 | 62.3 | 3.62 |
| 21 | 150 | 540 | 120 | 80 | 200 | 0.370 | 24 | 13.0 | 0.70 | 57.0 | 3.95 |

TABLE 2

| | |
|---|---|
| Positive electrode substrate, tab for positive electrode electricity collection | Aluminum |
| Negative electrode substrate, tab for negative electrode electricity collection | Copper |
| Positive active material | (Excessive Li type) $LiMn_2O_4$ |
| Negative active material | Highly graphitized carbon material (fiber quality) |
| Electrolyte   Electrolyte | $LiPF_6$ |
| Solvent | EC + DEC |

FIGS. 3(a) and 3(b) are graphs showing the relationship between the total thickness ratio and the battery's internal resistance as well as energy density in Table 1. FIGS. 3(a) and 3(b) reveal that the energy density tends to get smaller as the total thickness ratio increases. The fact that the total thickness ratio is large means that the total thickness of electrode substrates is thick and/or the total thickness of electrode active material layers is thin, but this is an inevitable outcome if any of the cases means that quantity of electrode active materials per unit weight grows less. Accordingly, from the view point of energy density, smaller total thickness ratio is preferable, but in the case where the phenomenon of discharge of a great current has been taken into consideration, internal resistance characteristics are regarded as more important than this energy density.

And, taking a look at the relationship between the total thickness ratio and the internal resistance, any of FIGS. 3(a) and 3(b) remarkably reveals that when the total thickness ratio falls within a particular range of values, the internal resistance gets smaller. For example, in the case where the total thickness is 0.042, the internal resistance has grown larger by approximately 10% than in the case with the total thickness being 0.05. This is thought to be caused by the fact that resistance of an electrode substrate grows larger when the electrode substrate is too thin.

On the other hand, in the case where the total thickness ratio is 0.33, the internal resistance has increased by approximately 5%, as compared with the case of the total thickness ratio being 0.306. In this case, it is thought to be caused by the fact that number of turns decreased due to the electrode substrate having become thicker, and consequently the charging/discharging area contributing to the battery reaction decreased and resistance of electrode reaction portion increased. On the other hand, with the total thickness ratio within the range not less than 0.045 and not more than 0.31, any big change in internal resistance can be seen.

With such a result, a range where no sudden changes in internal resistance take place, that is, the range where the total thickness ratio is not less than 0.045 and not more than 0.31, more preferably the range of not less than 0.05 and not more than 0.25, is at the same time the range to be able to control the internal resistance to a small amount, and thus preferable. Reduction in internal resistance not only enables a stable discharge of a huge current but also makes energy loss at the time of charging/discharging smaller, and thus improves the charging/discharging cycle characteristics.

Next, FIGS. 4(a) and 4(b) are graphs showing the relationship between the correction winding density and the battery's internal resistance as well as energy density at the time when the correction winding density (turns) has been defined by multiplying the number of winding (turns/cm) of the positive electrode 2 or the negative electrode 3 per unit length along the direction of diameter of the internal electrode body 1 with the total thickness (cm) of the electrode active material layers. As the correction winding density gets larger, the energy density tends to gets larger. This is caused by the fact that a larger number of turns of the electrodes 2 and 3 per unit length along the direction of diameter of the internal electrode body 1 and/or thicker total thickness of the electrode active materials results in a greater amount of electrode active materials contributing to the battery reaction.

However, as remarkably shown in FIG. 4(b), in the case with the correction winding density being 0.70 (turns), the internal resistance has increased by approximately 9% compared with the case with the correction winding density being 0.73 (turns). In addition, with the correction winding density being not less than 0.73 (turns), there are no big changes in the internal resistance, which, moreover, has been suppressed to small values. This takes place because the smaller correction winding density means a thicker electrode substrate, where the correction winding density is a parameter which does not depend on the thickness of the electrode active material layer, but depends on the thickness of the electrode substrate. Therefore, with regard to the relationship between the correction winding density and the internal resistance, an argument similar to that on the relationship between the total thickness ratio and the internal resistance described before is applicable.

The internal resistance increases under the condition that the correction winding density decreases to reach not more than 0.69 (turns), which is shown in FIG. 4(a) not more remarkably than in FIG. 4(b). On the other hand, with the correction winding density being not less than 0.69 (turns), there are no big changes in the internal resistance. However, in the case where the internal resistance values themselves have been taken into consideration, it is judged that the correction winding density of not less than 0.73 (turns) is preferable. Accordingly, as a result of the above, in the present invention, it is judged that the correction winding density of not less than 0.73 (turns) can reduce the internal resistance of batteries and is preferable.

Incidentally, at the time when winding pressure has been changed while a battery is being formed, the correction winding density is to change per this winding pressure. However, as with regard to the upper limit of the correction winding density, it goes without saying that due to a predetermined thickness of electrodes there is naturally a limit to the winding density in spite of higher winding pressure. In addition, when the winding pressure is heightened too much, it is a concern that they may result in the electrodes breaking, or at a later time the electrolyte could become impermeable to inside the internal electrode body, and as a consequence the battery reaction might not go on well and the internal resistance could increase. On the other hand, when the winding pressure is insufficient, the internal electrode body might not be able to maintain in a fixed shape. Accordingly, to form a battery, the winding pressure is to be set under predetermined conditions.

The configuration of the above-described lithium secondary battery of the present invention is suitably applied to huge capacity batteries with the battery capacity of not less than 5 Ah, and in that case, reduction effect of internal resistance remarkably appears. But, it goes without saying that the configuration may be applied to batteries with the capacity of not more than 5 Ah as well. Thus due to small internal resistance, discharge of huge currents becomes feasible without any obstacles, thus the lithium secondary battery of the present invention is suitably used for an electric vehicle (EV) or a hybrid electric vehicle (HEV).

Up until now, the lithium secondary battery of the present invention has been described in detail, and when the present invention is compared with the invention disclosed in the above-described Japanese Patent Laid-Open No. 2701347 specification, it is obvious that their configuration, effects, and functions are respectively different each other.

As described above, in the lithium secondary battery of the present invention, the thickness ratio of the thickness of electrode substrates and electrode active material layers in electrodes is set at a suitable ratio so that the resistance of the internal electrode body of a battery is reduced. Therefore, the battery can be used without any obstacles for an EV as well an HEV or the like, where discharging of huge currents takes place frequently. In addition, according to the present invention, charging/discharging loss is reduced to suppress Jules' heat to be generated, and consequently an excellent effect can be obtained that deterioration of batteries can be controlled and charging/discharging cycle characteristics can be improved. Moreover, by using materials having lower resistance as electrode active materials, the configuration is characterized by high output under conditions of deeper discharging depths. In addition, it becomes possible to make the shape of the internal electrode body of a battery compact within a range so as to secure necessary battery capacity, and space utility for disposition of a battery is improved, which serves to attain an effect that reduction of production costs can be planned.

What is claimed is:

1. A lithium secondary battery, comprising a positive electrode, a negative electrode, a separator, an internal electrode body, and an organic electrolyte, the positive electrode and the negative electrode being wound through the separator so that the positive electrode and the negative electrode are not brought into direct contact with each other, wherein when the number of turns of the positive electrode or the negative electrode per unit length (turns/cm) along the direction of diameter of the internal electrode body is multiplied by total thickness (cm) of the electrode active material layers, being designated as a correction winding density (turns), the correction winding density is not less than 0.73 turns.

2. The lithium secondary battery according to claim 1, wherein the positive active material to be used in the positive electrode is $LiMn_2O_4$ spinel.

3. The lithium secondary battery according to claim 2, wherein the Li/Mn ration in the $LiMn_2O_4$ spinel exceeds 0.5.

4. The lithium secondary battery according to claim 1, wherein the negative active material to be used in the negative electrode is highly graphitized carbon material.

5. The lithium secondary battery according to claim 4, wherein the highly graphitized carbon material is in form of fiber quality.

6. The lithium secondary battery according to claim 1, wherein the battery capacity is not less than 5 Ah.

7. The lithium secondary battery according to claim 1, wherein the battery is used in an electric vehicle or a hybrid electric vehicle.

* * * * *